United States Patent
Das et al.

(10) Patent No.: US 11,501,543 B2
(45) Date of Patent: Nov. 15, 2022

(54) SYSTEM AND METHOD FOR AUTOMATIC REAL-TIME LOCALIZATION OF LICENSE PLATE OF VEHICLE FROM PLURALITY OF IMAGES OF THE VEHICLE

(71) Applicant: VIDEONETICS TECHNOLOGY PRIVATE LIMITED, Kolkata (IN)

(72) Inventors: Sudeb Das, Asansol (IN); Apurba Gorai, District Bankura (IN); Tinku Acharya, Kolkata (IN)

(73) Assignee: VIDEONETICS TECHNOLOGY PRIVATE LIMITED, Kolkata (IN)

( * ) Notice: Subject to any disclaimer, the term of this patent is extended or adjusted under 35 U.S.C. 154(b) by 113 days.

(21) Appl. No.: 17/041,856

(22) PCT Filed: Mar. 26, 2019

(86) PCT No.: PCT/IN2019/050244
§ 371 (c)(1),
(2) Date: Sep. 25, 2020

(87) PCT Pub. No.: WO2019/186583
PCT Pub. Date: Oct. 3, 2019

(65) Prior Publication Data
US 2021/0027086 A1    Jan. 28, 2021

(30) Foreign Application Priority Data
Mar. 26, 2018    (IN) ............................ 201831007208

(51) Int. Cl.
*G06V 20/62*    (2022.01)
*G06T 7/13*    (2017.01)
(Continued)

(52) U.S. Cl.
CPC ................ *G06V 20/63* (2022.01); *G06T 3/60* (2013.01); *G06T 7/13* (2017.01); *G06V 10/30* (2022.01);
(Continued)

(58) Field of Classification Search
None
See application file for complete search history.

(56) References Cited

U.S. PATENT DOCUMENTS 7,151,863 B1 * 12/2006 Bradley ............... H04N 1/3935
358/525
7,519,221 B1 * 4/2009 Nicholson ............. G06T 11/203
382/209
(Continued)

FOREIGN PATENT DOCUMENTS

WO    WO-2015147764 A1 * 10/2015 ........... G06K 9/3233

OTHER PUBLICATIONS

Gao, Dezhi, Wei Li, Jianmin Duan, and Banggui Zheng. "A practical method of road detection for intelligent vehicle." In 2009 IEEE International Conference on Automation and Logistics, pp. 980-985. IEEE, 2009. (Year: 2009).*
(Continued)

*Primary Examiner* — Michelle M Entezari
(74) *Attorney, Agent, or Firm* — Pearl Cohen Zedek Latzer Baratz LLP

(57) ABSTRACT

The present invention discloses a system and a method for language independent automatic license plate localization by analysis of plurality of images in real-time under daylight condition without using any external light. In one embodiment, the system can work without any spatiality constraints and/or demographic considerations without any restriction on jurisdiction and can effectively localize license plates (LPs) of any type consisting of alpha-numeric char-
(Continued)

acters and symbols. In other embodiment, methods for search-space reduction system based on motion-based filtration and LPs localization based on edge-active-region filtration with high frame-per-second (FPS) throughput are described. In another embodiment, a dual-binarization scheme is described for color invariant LP localization.

10 Claims, 6 Drawing Sheets

(51) Int. Cl.
*G06T 3/60* (2006.01)
*G06V 10/30* (2022.01)
*G06V 10/44* (2022.01)

(52) U.S. Cl.
CPC .......... *G06V 10/443* (2022.01); *G06V 20/625* (2022.01)

(56) References Cited

U.S. PATENT DOCUMENTS

| | | | | |
|---|---|---|---|---|
| 2004/0016870 | A1* | 1/2004 | Pawlicki | B60W 10/04 315/77 |
| 2005/0201592 | A1* | 9/2005 | Peach | G06V 20/63 382/104 |
| 2005/0238229 | A1* | 10/2005 | Ishidera | G06V 10/56 382/173 |
| 2006/0228042 | A1* | 10/2006 | Archer | G06V 10/431 382/275 |
| 2007/0296621 | A1* | 12/2007 | Yoshizawa | H03M 1/0827 341/155 |
| 2008/0273807 | A1* | 11/2008 | Dauw | H04N 19/21 382/237 |
| 2012/0179742 | A1* | 7/2012 | Acharya | H04N 21/23116 709/202 |
| 2013/0004063 | A1* | 1/2013 | Tamura | G06V 10/26 382/164 |
| 2015/0246115 | A1* | 9/2015 | Falkenberg | A61K 9/1611 424/85.1 |
| 2017/0300786 | A1* | 10/2017 | Gope | G06T 5/002 |
| 2017/0364239 | A1* | 12/2017 | Gould | G06F 3/04886 |
| 2018/0061068 | A1* | 3/2018 | Jiao | G06V 10/44 |
| 2018/0234568 | A1* | 8/2018 | Das | G06V 30/40 |

OTHER PUBLICATIONS

Hypermedia Image Processing Reference, copyright 2002 https://www.dsi.unive.it/~atorsell/Hipr.pdf (Year: 2002).*
Blackburn, Jaron, and Eraldo Ribeiro. "Human motion recognition using isomap and dynamic time warping." Workshop on Human Motion. Springer, Berlin, Heidelberg, 2007. (Year: 2007).*
CN101937508A [English Abstract & Novelty] (Year: 2011).*
Yoon Y, Ban KD, Yoon H, Kim J. Blob extraction based character segmentation method for automatic license plate recognition system. In2011 IEEE International Conference on Systems, Man, and Cybernetics Oct. 9, 2011 (pp. 2192-2196). IEEE. (Year: 2011).*
Du S, Ibrahim M, Shehata M, Badawy W. Automatic license plate recognition (ALPR): A state-of-the-art review. IEEE Transactions on circuits and systems for video technology. Jun. 7, 2012;23(2):311-25. (Year: 2012).*
Chang SL, Chen LS, Chung YC, Chen SW. Automatic license plate recognition. IEEE transactions on intelligent transportation systems. Mar. 8, 2004;5(1):42-53. (Year: 2004).*
Kong J, Liu X, Lu Y, Zhou X. A novel license plate localization method based on textural feature analysis. InProceedings of the Fifth IEEE International Symposium on Signal Processing and Information Technology, 2005. Dec. 21, 2005 (pp. 275-279). IEEE. (Year: 2005).*
Kulkarni P, Khatri A, Banga P, Shah K. A feature based approach for localization of Indian number plates. In2009 IEEE International Conference on Electro/Information Technology Jun. 7, 2009 (pp. 157-162). IEEE. (Year: 2009).*

* cited by examiner

SYSTEM AND METHOD FOR AUTOMATIC REAL-TIME LOCALIZATION OF LICENSE PLATE OF VEHICLE FROM PLURALITY OF IMAGES OF THE VEHICLE

CROSS-REFERENCE TO RELATED APPLICATIONS

This application is a National Phase Application of PCT International Application No. PCT/IN2019/050244, International Filing Date Mar. 26, 2019, claiming the benefit of Indian Patent Application No. 201831007208, filed Mar. 26, 2018, which is hereby incorporated by reference.

FIELD OF THE INVENTION

The present invention relates to license plate localization. More specifically, the present invention is directed to develop a system and a method for language independent automatic real-time localization of license plate of a vehicle from plurality of images of the vehicles.

BACKGROUND OF THE INVENTION

Development of a computationally efficient and robust automatic license plate recognition (ALPR) system that can be used on field across different demographics and accommodating variations in license plates (LPs) is a challenging task. An ALPR system should be invariant to the background and foreground colors of the LPs and should be independent of the scripts and fonts used to write the alpha-numeric characters in the LP. State-of-the-art ALPR systems often work efficiently for a specific type of LP corresponding to a specific country. In most of the cases existing ALPR systems are dependent on the dimension and shape of the LPs specific to a specific country. Moreover, the script and fonts of alpha-numeric characters and symbols used in LPs throughout the world are different—which causes problem for many existing ALPR systems to work efficiently without any modification in the system configuration. Furthermore, LPs often have different foreground-background color combinations and many countries also have multi-colored as well as multi-textured LPs. The popular techniques of image thresholding/binarization, edge detection based LP localization schemes often fail in these different situations.

There are various ways to locate LPs in an image. Some of these existing schemes are based on image thresholding, template-matching, edge projection profiling etc. The problem with image thresholding based LP detection schemes is that image thresholding by its intrinsic nature is not color invariant. Considering an image with LPs having foreground-background of various color combinations, it is difficult for the popularly used image thresholding methods to correctly binarize the frames. There are some binarization schemes which utilize color information of the images. These methods perform better than their gray-scale counterpart, but are time consuming. As a result, for all practical purposes, these schemes cannot be used in applications where high FPS processing is required.

The schemes based on template-matching also work effectively for known-types of LPs. The templates are input to the system and regions in the input frame that match the templates are detected. This makes the system a closed system with compatibility to some given templates only. Moreover, template-matching often employs overlapping sliding—window protocol for identifying LP location. This results in high computational cost and reducing the processing speed. Among the various popularly used image LP detection techniques, edge based schemes perform effectively and that too reasonably in near-real time. But, if an image region contains too much edge-like structures around the LP location—the vertical and horizontal edge projection based methods fail in these situations. Methods based on deep learning technology perform better but require high computing environment. Therefore, an effective LP detection scheme is needed which should simultaneously have high accuracy and low computational requirements.

REFERENCES

1. Vehicle prediction and association tool based on license plate recognition—U.S. Pat. No. 9,542,653 B1—Jan. 10, 2017
2. Segmentation free approach to automatic license plate recognition—U.S. Pat. No. 9,418,305 B1—Aug. 16, 2016
3. Methods for vehicle identification and specification recall with localization optimization for license plate recognition—US 2017/0140237 A1—May 18, 2017
4. Annotation free license plate recognition method and system—U.S. Pat. No. 9,536,315 B2—Jan. 3, 2017
5. Methods and systems for optimized parameter selection in automated license plate recognition—U.S. Pat. No. 9,292,759 B2—Mar. 22, 2016
6. Method and system for bootstrapping an OCR engine for license plate recognition—U.S. Pat. No. 9,501,707 B2—Nov. 22, 2016
7. License plate recognition—U.S. Pat. No. 9,405,988 B2—Aug. 2, 2016
8. License plate matching systems and methods—US 2016/0299897 A1—Oct. 13, 2016
9. Leveraging character-by-character image classifiers to improve license plate state identification—U.S. Pat. No. 9,405,985 B1—Aug. 2, 2016
10. Dynamic Bayesian networks for vehicle classification in video—U.S. Pat. No. 9,466,000 B2—Oct. 11, 2016
11. Shadow detection and removal in license plate images—US 2018/0012101 A1—January 2018
12. Method and apparatus for verifying vehicle ownership from an image—US 2018/0012096 A1—January 2018
13. Methods for mobile image capture of vehicle identification numbers in a non-document—US 2018/0012100 A1—January 2018
14. M. K. Saini et al., "Multiwavelet Transform Based Number Plate Detection," J. Vis. Commn. Image R., 2017
15. M. R. Asif et al., "Multinational vehicle license plate detection in complex backgrounds," J. Vis. Commn. Image R., 2017
16. R. Panahi et el., "Accurate Detection and Recognition of Dirty Vehicle Plate Numbers for High-Speed Applications," IEEE TRANSACTIONS ON INTELLIGENT TRANSPORTATION SYSTEMS, VOL. 18, NO. 4, APRIL 2017
17. C. Gau et al., "Vehicle License Plate Recognition Based on External Regions and Restricted Boltzmann Machines," IEEE TRANSACTIONS ON INTELLIGENT TRANSPORTATION SYSTEMS, 2015
18. A. Safaei et al., "Real-time search-free multiple license plate recognition via likelihood estimation of saliency," Computers and Electrical Engineering, 2016
19. Y. Yuan et al., "A Robust and Efficient Approach to License Plate Detection," IEEE TRANSACTIONS ON IMAGE PROCESSING, 2016

20. Y. Tang et al., "Vehicle detection and recognition for intelligent traffic surveillance system" Multimed. Tools Appl., 2015
21. J. Wang et al., "An effective method for plate number recognition" Multimed. Tools Appl., 2017
22. L. Xie et al., "A new CNN-based method for multi-directional car license plate detection" IEEE Trans. ITS., 2018
23. M. S. Al-Shermarry., "Ensemble of Adaboost cascades of 3L-LBPs classifiers for license plates detection with low quality images" Expert Systems with Applications, 2018

OBJECT OF THE INVENTION

It is thus the basic object of the present invention is to develop a system and a method for language independent automatic localization of license plate of a vehicle from plurality of images of the vehicles.

Another object of the present invention is to develop a system and a method for language independent automatic localization of license plate of a vehicle from plurality of images of the vehicles which will be adapted to localize the vehicle license plate in real-time by analyzing the plurality of images of the vehicles under day-light condition without using any external light.

Another object of the present invention is to develop a system and a method for language independent automatic localization of license plate of a vehicle from plurality of images of the vehicles which will be adapted to select image regions containing license plates of vehicles for search-space reduction without any restriction on jurisdiction and multi-lingual scripts.

Another object of the present invention is to develop a system and a method for language independent automatic localization of license plate of a vehicle from plurality of images of the vehicles which will be adapted to localize the vehicle license plate in real-time by analyzing the plurality of images the vehicles irrespective of color of the license plate.

SUMMARY OF THE INVENTION

Thus according to the basic aspect of the present invention there is provided a system for language independent automatic real-time localization of license plate (LP) of a vehicle from plurality of images of said vehicle comprising image grabber module to capture images of the vehicle forwarded to a connected imaging processor;

said imaging processor to receive the captured images of the vehicle for automatic real-time localization of license plate of the vehicle from the image of the vehicle by analyzing illumination/light independent image characteristics;

said imaging processor includes
edge region detection filter for edge active region based filtrations of some regions of the input image corresponding to probable LP regions;
dual-binarization unit for dual-binarization of output of the edge region filter;
grouping unit for grouping and connecting character like components remaining after removal of the noise from the dual-binarized output based on some pre-defined rules to localize the LP.

In a preferred embodiment of the present system, the imaging processor implements the probable LP regions identification involving
down-sampling the input image to a lower resolution to achieve computational efficiency without sacrificing the localization accuracy;

applying motion-based search-space reduction and searching vertical edge active regions in the input image by applying the edge-detection filter on the input image, wherein the edge active regions with too-large or too-small edges are discarded by and morphological closing operation is applied on the rest of the edge-active regions to get a closed image; qualifying the closed image for further processing including removal of the noisy-regions based on dimension of the probable LP regions.

In a preferred embodiment of the present system, the imaging processor includes width and height based region splitting modules are used for splitting and removal of noisy too-large or too-small edges.

In a preferred embodiment of the present system, the motion-based search-space reduction includes
involving down-sampled version of the input image frames and grey-scaling the same;
obtaining initial motion regions by applying frame-differencing operations on the down-sampled grayscale version of the input images;
removing smaller, isolated motion regions which are corresponds to noises to get a cleaner image;
applying morphology closing operation on the cleaned image for subsequent processing.

In a preferred embodiment of the present system, the edge region detection filter searches the vertical edge active regions corresponding to vertical edges of alphanumeric characters of the LP from the morphologically closed cleaned motion-based search-space reduced image regions;
wherein very small and very large vertical edges is discarded as noise and then morphologically closed;
said morphologically closed image describes probable regions where LPs can exist.

In a preferred embodiment of the present system, the morphology closing operation is applied to fill smaller gaps or to remove noise.

In a preferred embodiment of the present system, the dual-binarization unit binarize the probable image regions where LPs can exist by involving gray-converted version of the image regions and negative gray-converted version thereof, whereby local image thresholding/binarization scheme is applied on both the image versions and both the binarized images are merged after noisy components removal based on height and width to have LP regions with character likes components as foreground (white) and rest of the LP regions as background (black) invariance of actual color of the LPs.

In a preferred embodiment of the present system, the grouping unit is adapted operate on output of the dual-binarization unit which is a binary image containing character like components as foreground (white) and rest as background (black).

In a preferred embodiment of the present system, the grouping unit for grouping and connecting character like components includes
discarding the components which are isolated from further processing as a valid LP cannot contain single character (component) in it;
clustering remaining components in different groups based on various comparing statistics;
merging horizontally and/or vertically closely located groups to constitute the probable LP regions.

In a preferred embodiment of the present system, the grouping unit applies connected component analysis on output of the dual-binarization unit for each pair of components whereby the components discarded to grouped based on measurement of statistics like slope, height ratio, width ratio, row/column separation and like;

whereby the groups with components less than a pre-defined number of components are discarded.

According to another aspect, there is provided a method for language independent automatic real-time localization of license plate (LP) of a vehicle from plurality of images of said vehicle involving the above system comprising capturing images of the vehicle by the image grabber module and forwarding the same to the connected imaging processor;

receiving the captured images of the vehicle in the imaging processor for automatic real-time localization of license plate of the vehicle from the image of the vehicle by analyzing illumination/light independent image characteristics including the edge active region based filtrations of regions of the input image corresponding to probable LP regions by the edge region detection filter;

dual-binarization of output of the edge region detection filter by the dual-binarization unit;

grouping and connecting character like components remaining after removal of the noise from the dual-binarized output based on some pre-defined rules by the grouping unit to localize the LP.

BRIEF DESCRIPTION OF THE ACCOMPANYING DRAWINGS

Figure 2:
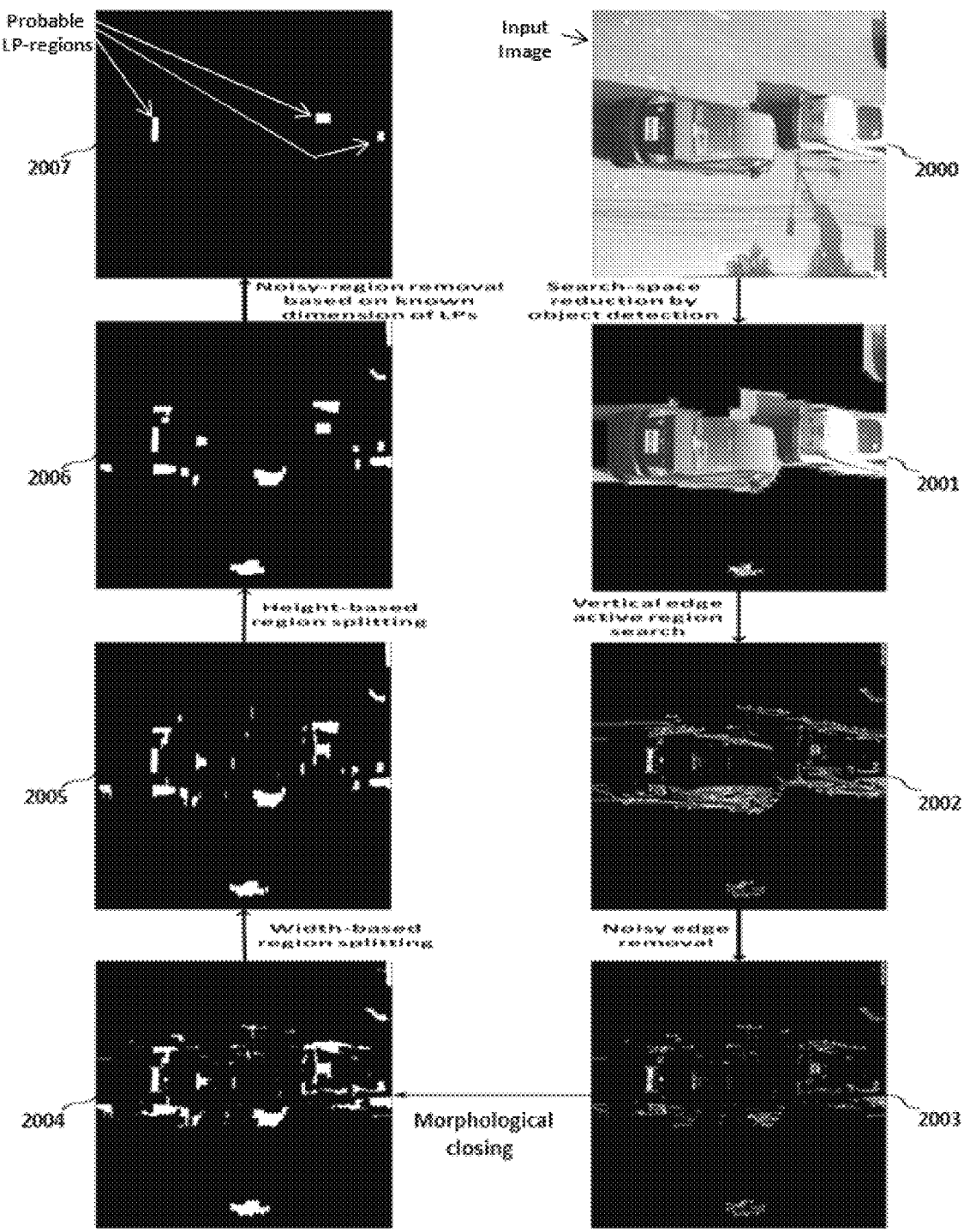
FIG. 2 depicts the block diagram of the system and or module implemented in accordance with the disclosed embodiments regarding the probable LP regions identification.
Figure 2A:
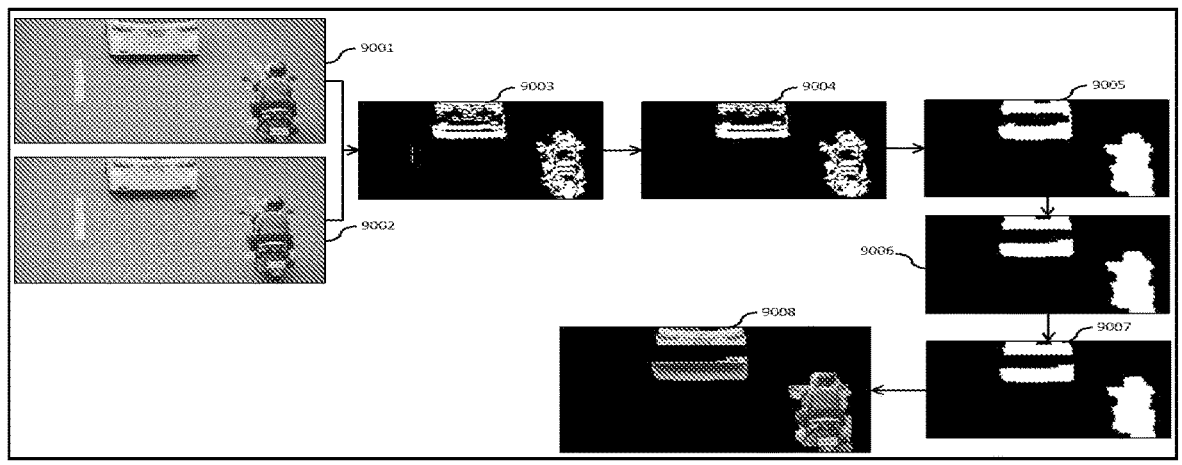
FIG. 2a shows motion-based search space-reduction steps associated with the disclosed embodiments regarding the probable LP regions identification.
Figure 2B:
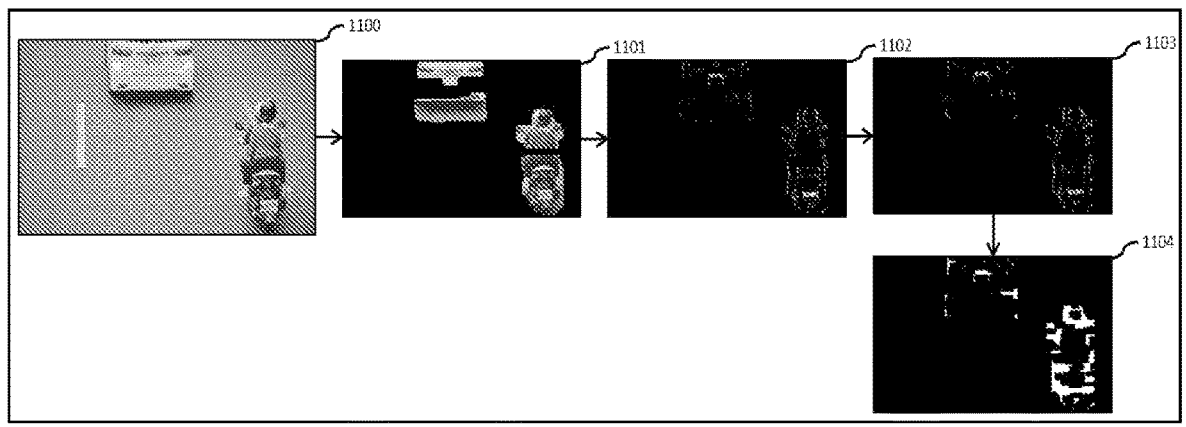

FIG. 2b describes vertical edge active regions searching by vertical edge-detection filter applied on morphologically closed cleaned motion-based search-space reduced image associated with the disclosed embodiments regarding the probable LP regions identification.

Figure 2C:
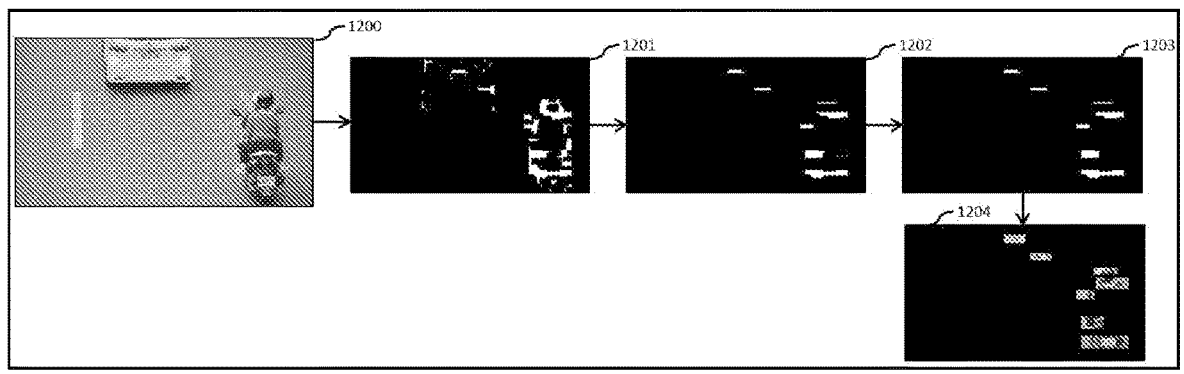

FIG. 2c shows the steps for the Morphological closing-based search-space reduction associated with the disclosed embodiments regarding the probable LP regions identification.

Figure 3:
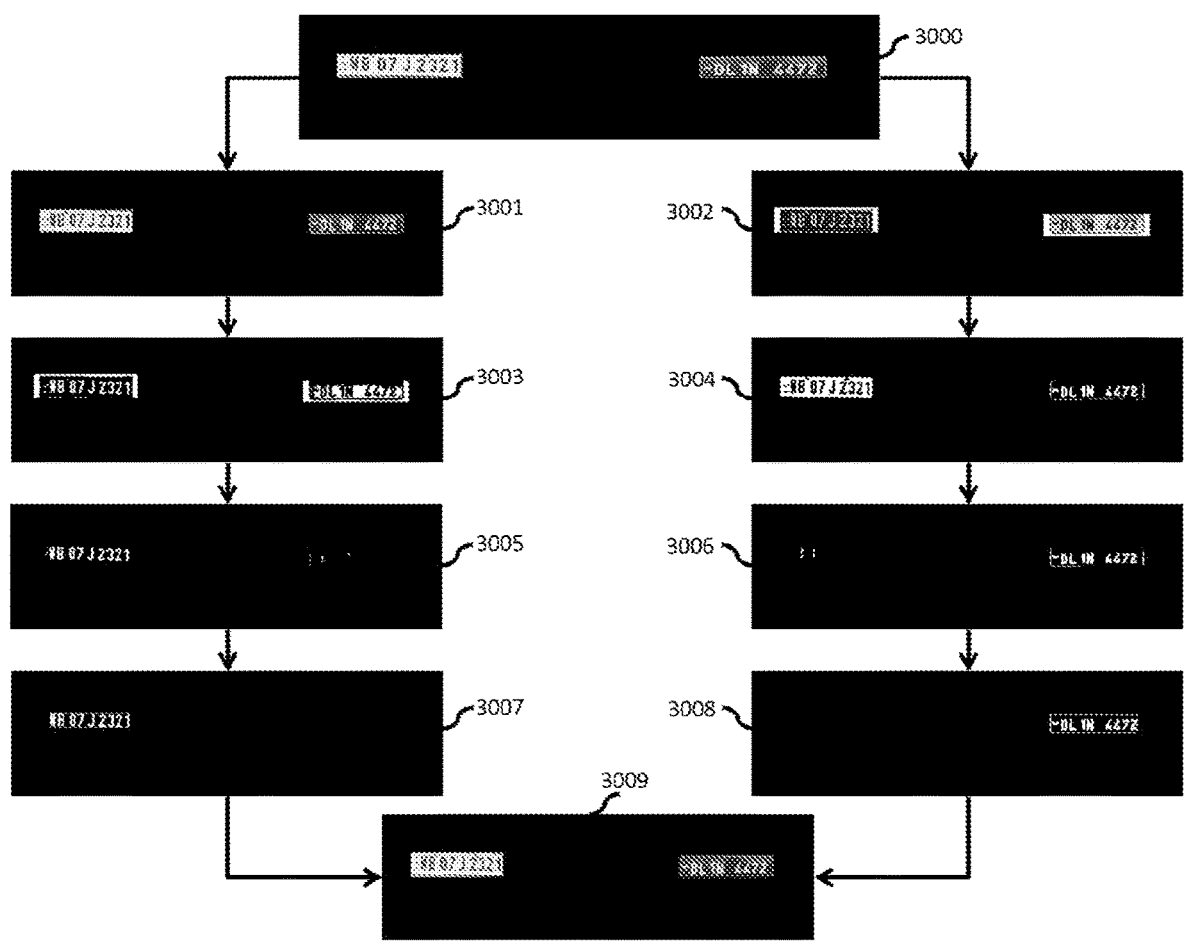

FIG. 3 depicts the block diagram of the system and or module implemented in accordance with the disclosed embodiments regarding the dual-binarization based noise removal.

Figure 4:
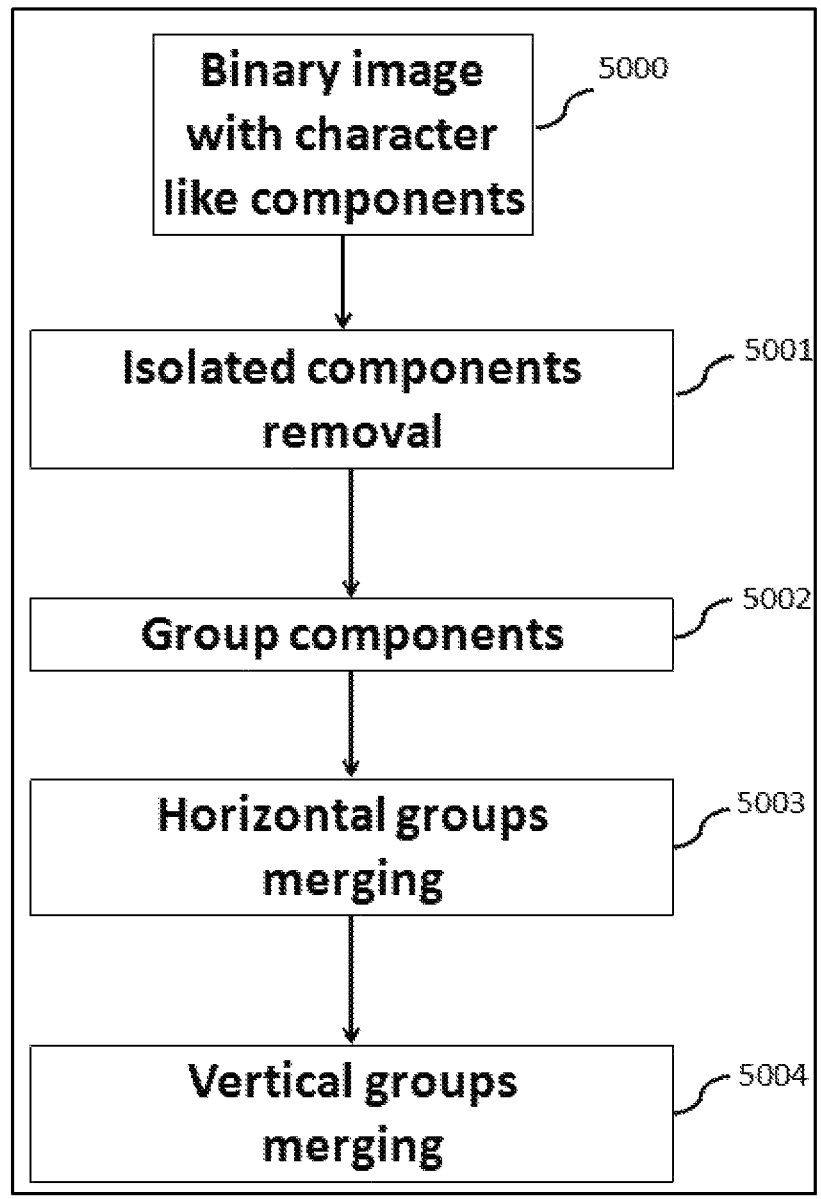

FIG. 4 depicts the block diagram of the system and or module implemented in accordance with the disclosed embodiments regarding the character like components grouping and merging.

Figure 5:
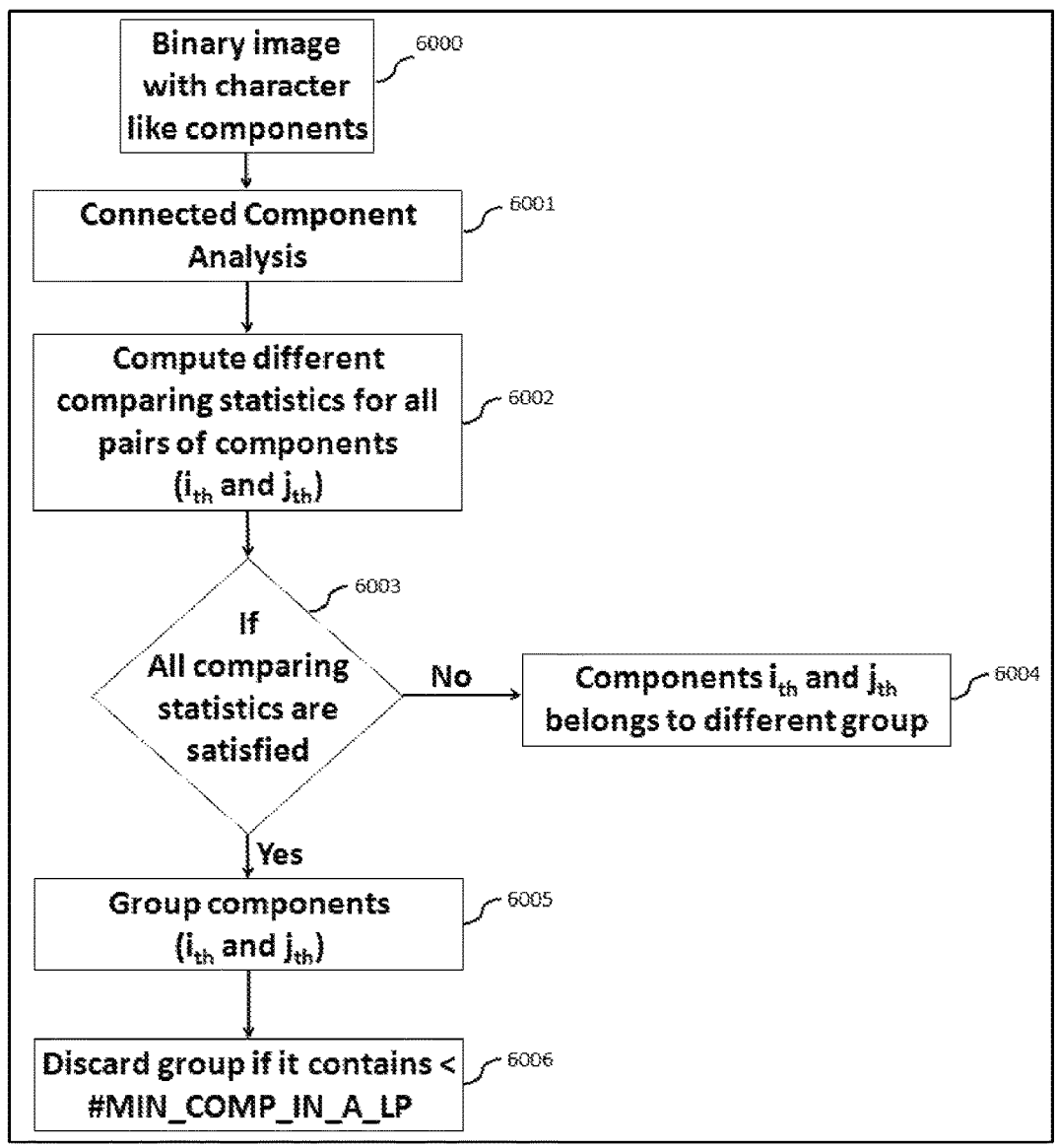

FIG. 5 depicts in details the block diagram of the system and or module implemented in accordance with the disclosed embodiments regarding the character like components grouping.

Figure 6:
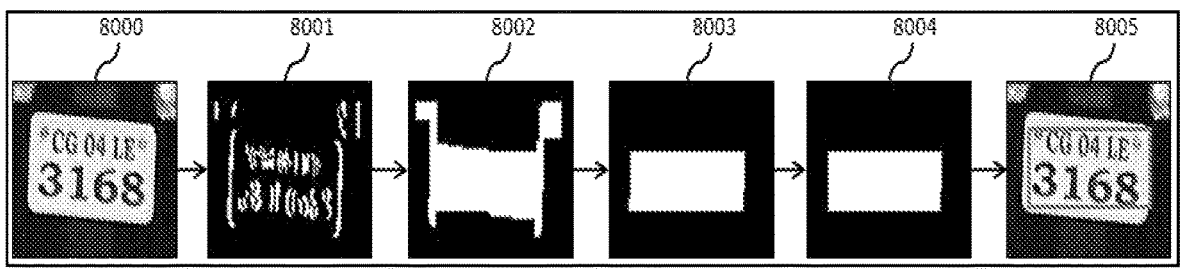

The FIG. 6 corroborates the LP dimension in the noise removal process in accordance with the disclosed embodiments regarding the character like components grouping.

DESCRIPTION OF THE INVENTION WITH REFERENCE TO THE ACCOMPANYING DRAWINGS

Figure 1:
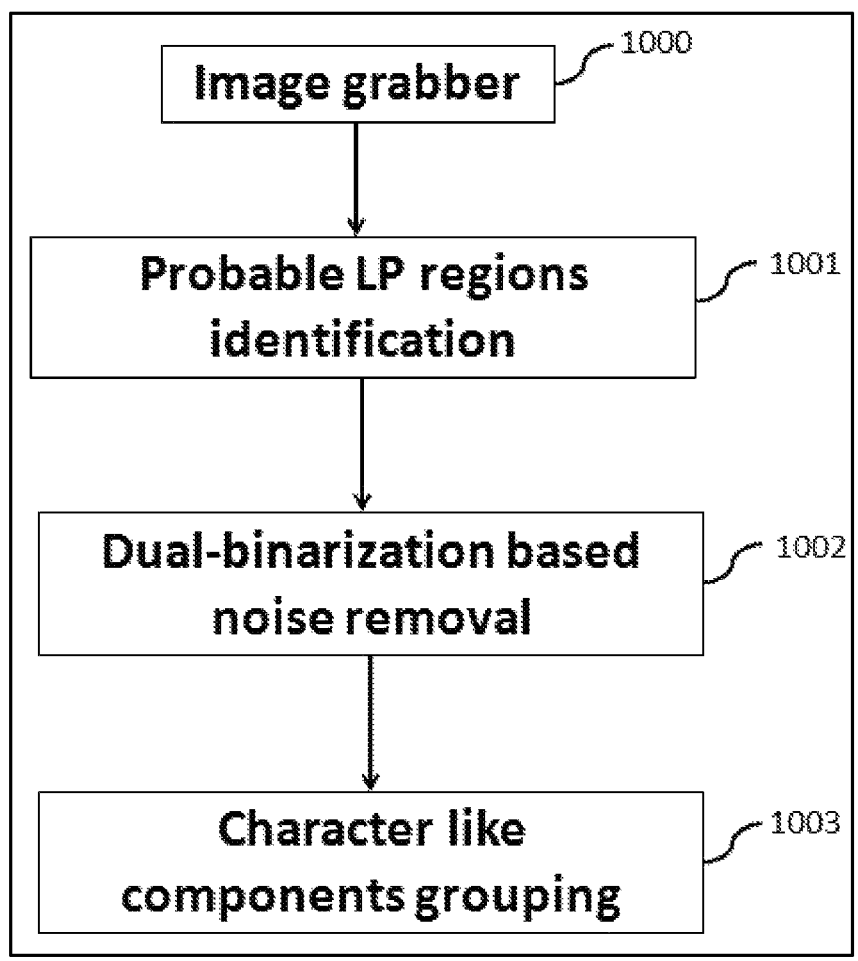
FIG. 1 depicts the overall block diagram of the system and or module implemented in accordance with the disclosed embodiments regarding the LP localization.

The accompanying FIG. 1 describes the overall block diagram of the LP localization system/method. [1000] can be any input image/video (plurality of images) source or image grabber module. The image grabber module [1000] is basically a traffic surveillance camera configured to capture images of the traffic or vehicles. The images of the vehicle as captured by the image grabber module [1000] are then forwarded to a connected imaging processor for automatic real-time localization of license plate of the vehicle from the images of the vehicles by analyzing illumination/light independent image characteristics (like edges, corners etc.). The imaging processor includes edge region detection filter [1001] wherein based on edge-active-region filtrations some regions of the input image are identified as the probable LP regions. The output of [1001] is passed to dual-binarization unit [1002] of the imaging processor for dual-binarization based noise removal. Remaining character like components are grouped by grouping unit [1003] of the imaging processor together based on some pre-defined rules. The output of [1003] is the localized LPs.

FIG. 2 depicts the block diagram of the probable LP regions identification operation as implemented by the imaging processor. The resolution of the input image [2000] can be down-sampled to a lower resolution to achieve computational efficiency without sacrificing the localization accuracy. Further computational efficiency can be achieved by motion-based search-space reduction [2001]. In [2002], vertical edge active regions are searched by applying the vertical edge-detection filter [i.e., Sobel's vertical edge filter] on the image. Edge active regions with too-large or too-small edges are discarded [2003]. Morphological closing operation is applied on the rest of the edge-active regions to get a closed image [2004]. Width [2004] and height [2005] based region splitting modules are used for splitting and removal of noisy (too-large or too-small) edges. Further noisy-regions can be removed [2006] if LPs dimensions are known before hand. Remaining regions [2007] are the probable LPs like regions qualified for further processing. As can be seen from the FIG. 2 and the above discussion that using the above mentioned simple and computation inexpensive steps the search-space can be reduced to a great extent for further processing thus achieving computation efficiency.

Herein it is important to note that, rather than working on the illumination dependent image characteristics like pixel intensity value directly—the presented invention is based on illumination/light independent image characteristics (like edges, corners etc.). Several intelligent processing stages are integrated to make the presented invention work under day-like condition without using any external light.

Reference is now invited from the accompanying FIG. 2a which shows motion-based search space-reduction steps. As shown in FIG. 2a, two input consecutive frames are denoted as [9001] (previous frame) and [9002] (current frame). The motion-based search-space reduction procedure is carried on a down-sampled (down-sampled by 10) version of the input frames to get computational efficiency. Down-sampling also helps to remove small noise in the images—resulting in further computational efficiency. [9003] shows the initial motion regions obtained after applying frame-differencing operations on the down-sampled grayscale version of the input images. There exist other more accurate foreground/motion detection techniques—but frame differencing requires very low computation. Smaller, isolated motion regions are removed from [9003] to get a cleaner image [9004]. This is due to the fact that too smaller motion regions are noise, and these do not contain any important information. [9005] describes the output after applying morphology closing operation on the previously cleaned image [9004]. This is required because if [9004] is used without [9005] for further processing then there is a chance that LPs areas might get removed in the subsequent steps because of their small dimensions. [9006] and [9007] show the outputs after applying width-based and height-based region splitting procedures based on some pre-defined thresholds. The final output is shown in [9008]. As can be seen, comparing [9002] (current frame) and the final output [9008] that the described motion-based search-space reduction scheme is effective in identifying important regions of the input frame [9002] which might contain LPs like regions. The proposed technique without requiring any complex operations and operating on a very down-sampled version of the original image is itself very computation efficient and effective in reducing the search-space to a great extent for further processing.

Reference is next invited from the accompanying FIG. 2b which describes the vertical edge active regions searching by vertical edge-detection filter applied on the morphologically closed cleaned motion-based search-space reduced image. [1101] shows the limited regions obtained after applying the motion-based search-space reduction scheme on the input current frame [1100]. As the alphanumeric characters of a LP primarily contain vertical edges—so rather than finding all the edges in the search space—only the vertical edges are identified using only vertical edge filter. This provides two benefits—1) using only vertical edge detection reduces the computation requirement and 2) the search-space is further reduced to great extent for further processing. [1102] shows the output image containing only the vertical edges. Very small and very large vertical edges can be discarded as noise [1103]. The output image [1104] is the morphology closed image describing probable regions where LPs can exist. It is also to be noted that these operations all are done on a down-sampled (down-sampled by 2) image of the input image [1100]—as a result further computational efficiency is achieved.

Reference is now invited from the accompanying FIG. 2c which shows the steps for the Morphological closing-based search-space reduction. Morphology closing is a basic operation in image processing/analysis. It is usually applied on some binary (containing only 1s and 0s) image to fill smaller gaps or to remove noise. The FIG. 1.3 describes the morphology closing operation on the previously cleaned edge image. This is required because if the cleaned image is used without considering the closed image for further processing then there is a chance that LPs areas might get removed in the subsequent steps because of their small dimensions. [1201] shows the vertical edge active regions of the input frame [1200]. Applying morphological closing operation considering horizontal structuring element on [1201], the resultant clean image is shown [1202]. This will help in reducing the over-extension effect due to closing operation. Height and width-based region splitting operations applied on [1202] results in the final clean image [1203]. [1204] shows the gray-scale portions of the clean binary image of [1203].

All these above-mentioned processing stages make the presented localization procedure to work under day-light condition without any external light source.

FIG. 3 depicts the dual-binarization based noise removal scheme by the dual-binarization unit. [3000] shows two exemplary regions identified as probable LPs like regions by probable LP regions identification system/method as mentioned above with the illustration of FIG. 2. There are two LPs in [3000] having opposite foreground-background color contrast. In the first LP, characters (foreground) are in black color and the plate (background) itself is in yellow color. The second LP has white characters (foreground) and red plate (background). The commonly used binarization schemes produces opposite foreground-background results in these two above mentioned situations. This is evident from [3003], in which characters are segmented as foreground (white) and the plate is segmented as background (black). But, for the second LP, the characters are segmented as background (black) and some portion of the plate is segmented as foreground (white) using some existing binarization technique. Therefore, in this situation if becomes difficult to localize LPs of multiple foreground-background color combinations using the same localization scheme. In the proposed system/method, [3001] depicts the gray-converted images of the original color images of [3000]. [3002] shows the negative gray-converted images of the original color images of [3000]. These images [3002] are produced by taking the negative of the images of [3001]. Now, some local image thresholding/binarization scheme (like Bradley, Sauvola etc.) is applied on both the images of [3001] and [3002]. As can be seen from [3003], binarization of the first LP produces valid foreground/background components from the original gray image. Similarly, binarization of the second LP in [3004] produces valid foreground/background components from the negative gray image. [3005] and [3006] show both the binarized images after noisy components removal based on height and width. [3007] depicts the merged binarized image obtained by merging [3005] and [3006]. It can be seen from [3007] that the merged image contains all the character likes components as foreground (white) and rest of the LPs as background (black). Thus color invariance property is achieved by the proposed dual-binarization scheme.

The accompanying FIG. 4 depicts the components grouping and merging scheme by the grouping unit. Output of [3007] is the dual-binarized output binary image containing character like components as foreground (white) and rest as background (black). Components which are isolated are discarded from further processing [5001]—because a valid LP cannot contain single character (component) in it. Remaining components are clustered [5002] in to different groups based on various comparing statistics (described in [6000]). Horizontal [5003] and vertical [5004] groups merging is need to merge horizontally and/or vertically closely located groups. Vertical group merging is also needed for LPs having multi-rowed characters.

The accompanying FIG. 5 depicts the group components [5002] mechanism in details. Connected component analysis (CCA) is applied on the output [3007] of dual-binarization based noise removal step. For each pair of components ($i_{th}$ and $j_{th}$) several comparing statistics can be measured like slope, height ratio, width ratio, row/col separation etc.— which can be used to initially group the components in the pair. If a pair satisfies all the comparing statistics then these components are clustered into a group. Otherwise, this pair of components does not belong to the same group. This procedure is repeated for each pair of components. After this step all the components should be contained in one or other group. Discard the groups [6006] which do not contain more than certain pre-defined number of components in it.

It is important to note that, in the present invention there is no strict requirement of knowing the LPs dimensions beforehand. The proposed methodology works efficiently even without this information. But, as the standard of LPs is different in different jurisdiction, if the dimension information of the standard LPs for that particular jurisdiction is available—then the described technique can utilize this information to achieve computation efficiency. In absence of this information the system has to search (compute) a bit more to locate the LPs in the FOV. In case if the dimension information is available beforehand, the system can be tuned to use this information effectively for reducing the search space further by discarding out-of-dimension component regions. For example, if it is known that the minimum dimension of the LPs can be M×N in the FOV—then this information can be used discard regions which are of lesser dimension. Moreover, various other parameters like the size of the structuring elements required for morphology closing operation, height and width thresholds used in height/width based region splitting operations can also be adaptively set based on the dimension of the LP.

The FIG. 6 corroborates the LP dimension in the noise removal process. If the LP dimension is known beforehand then the size of the structuring element used in morphology closing operation to get the closed image [8002] from the edge image [8001] can be set accordingly. This will help in reducing the over-extension effect due to closing operation. Similarly using the known dimension of the LP, the thresholds associated with height based and width based region splitting operations can also be set accordingly. This is shown in [8003] which describes the output after applying the width-based region splitting operation. If it is known that the minimum width of the LP can be (say) M pixels then—portion of rows of [8002] which contain less than M number of column-wise connected foreground (white) pixels can be set to background pixels. Similarly, portion of columns of [8003] which contain less than N number of row-wise connected foreground (white) pixels can be set to background—if it is known in advance that the minimum height of the LP can be (say) N pixels.

As mentioned earlier that in the absence of this dimension information—the steps described in the FIG. 6 will also be carried out with pre-defined fixed thresholds required in various operations.

We claim:

1. A system for real-time localization of license plate (LP) of a vehicle from plurality of images of said vehicle comprising
    an image grabber module to capture images of the vehicle forwarded to a connected imaging processor;
    said imaging processor to receive the captured images of the vehicle for automatic real-time localization of license plate of the vehicle from the image of the vehicle by analyzing illumination/light independent image characteristics;
    said imaging processor includes
        a dual-binarization unit for dual-binarization of probable LP regions in the images as extracted through edge active region based filtrations by an edge region detection filter;
        wherein said dual-binarization unit is configured to binarize the probable LP regions by involving gray-converted version of the probable LP regions and also a negative gray-converted version of said probable LP regions, whereby a local image thresholding/binarization scheme is applied on both the binarized image versions, and whereby both the binarized images are merged after noisy components removal based on height and width to have the LP regions with character likes components as foreground (white) and rest of the LP regions as background (black) invariance of original background-foreground color combination of the LPs; and
        a grouping unit for grouping and connecting the character like components remaining after removal of the noise from the dual-binarized output based on pre-defined rules to localize the LP.

2. The system as claimed in claim 1, wherein the imaging processor implements the probable LP regions identification involving
    down-sampling the input image to a lower resolution to achieve computational efficiency without sacrificing the localization accuracy;
    applying motion-based search-space reduction and searching vertical edge active regions in the input image by applying the edge-detection filter on the input image, wherein the edge active regions with too-large or too-small edges are discarded by and morphological closing operation is applied on the rest of the edge-active regions to get a closed image;
    qualifying the closed image for further processing including removal of the noisy-regions based on dimension of the probable LP regions.

3. The system as claimed in claim 1, wherein the imaging processor includes width and height based region splitting modules are used for splitting and removal of noisy too-large or too-small edges.

4. The system as claimed in claim 2, wherein the motion-based search-space reduction includes
    involving down-sampled version of the input image frames and grey-scaling the same;
    obtaining initial motion regions by applying frame-differencing operations on the down-sampled grayscale version of the input images;
    removing smaller, isolated motion regions which are corresponds to noises to get a cleaner image;
    applying morphology closing operation on the cleaned image for subsequent processing.

5. The system as claimed in claim 2, wherein the edge region detection filter searches the vertical edge active regions corresponding to vertical edges of alphanumeric characters of the LP from the morphologically closed cleaned motion-based search-space reduced image regions;
    wherein very small and very large vertical edges is discarded as noise and then morphologically closed; and
    said morphologically closed image describes probable regions where LPs can exist.

6. The system as claimed in claim 5, wherein the morphology closing operation is applied to fill smaller gaps or to remove noise.

7. The system as claimed in claim 1, wherein the grouping unit is adapted operate on output of the dual-binarization unit which is a binary image containing character like components as foreground (white) and rest as background (black).

8. The system as claimed in claim 1, wherein the grouping unit for grouping and connecting character like components includes
    discarding the components which are isolated from further processing as a valid LP cannot contain single character (component) in it;
    clustering remaining components in different groups based on various comparing statistics;
    merging horizontally and/or vertically closely located groups to constitute the probable LP regions.

9. The system as claimed in claim 1, wherein the grouping unit applies connected component analysis on output of the dual-binarization unit for each pair of components whereby the components discarded to grouped based on measurement of statistics like slope, height ratio, width ratio, row/column separation and like;

whereby the groups with components less than a pre-defined number of components are discarded.

10. A method for real-time localization of license plate (LP) of a vehicle from plurality of images of said vehicle involving the system as claimed in claim comprising capturing images of the vehicle by the image grabber module and forwarding the same to the connected imaging processor;

receiving the captured images of the vehicle in the imaging processor for automatic real-time localization of license plate of the vehicle from the image of the vehicle by analyzing illumination/light independent image characteristics including involving the dual-binarization unit for dual-binarization of probable LP regions in the images as extracted through edge active region based filtrations by the edge region detection filter including binarizing the probable LP regions by involving the gray-converted version of the probable LP image regions in the image and also the negative gray-converted version of the same said probable LP regions, applying local image thresholding/binarization scheme on both the binarized image versions; and merging both the binarized images after noisy components removal based on height and width to have the LP regions with character likes components as foreground (white) and rest of the LP regions as background (black) invariance of original actual background-foreground color combination colors of the LPs;

grouping and connecting the character like components remaining after removal of the noise from the dual-binarized output based on some pre-defined rules by the grouping unit to localize the LP.

* * * * *